United States Patent
Mittal et al.

(10) Patent No.: US 9,007,922 B1
(45) Date of Patent: Apr. 14, 2015

(54) SYSTEMS AND METHODS FOR TESTING AND ANALYZING CONTROLLER-BASED NETWORKS

(71) Applicant: Juniper Networks, Inc., Sunnyvale, CA (US)

(72) Inventors: Anuj Anand Mittal, San Jose, CA (US); Animesh Patcha, Milpitas, CA (US); Raj Sahu, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 149 days.

(21) Appl. No.: 13/901,554

(22) Filed: May 23, 2013

(51) Int. Cl.
H04L 12/26 (2006.01)

(52) U.S. Cl.
CPC ............ *H04L 43/0805* (2013.01); *H04L 43/50* (2013.01)

(58) Field of Classification Search
CPC ............................ H04L 43/0805; H04L 43/50
USPC .......................................... 370/242, 244, 252
See application file for complete search history.

(56) References Cited

U.S. PATENT DOCUMENTS

| | | | | |
|---|---|---|---|---|
| 2010/0180155 | A1* | 7/2010 | Gorman et al. | 714/37 |
| 2011/0143747 | A1* | 6/2011 | Jia et al. | 455/423 |
| 2012/0158240 | A1* | 6/2012 | Downs et al. | 701/30.1 |
| 2013/0054170 | A1* | 2/2013 | Sobajic et al. | 702/82 |
| 2013/0070908 | A1* | 3/2013 | Beaumont et al. | 379/21 |
| 2013/0179858 | A1* | 7/2013 | Mecke et al. | 717/106 |
| 2013/0259470 | A1* | 10/2013 | Zhong et al. | 398/16 |
| 2013/0340083 | A1* | 12/2013 | Petrica et al. | 726/25 |

OTHER PUBLICATIONS

McKeown, Nick et al., "OpenFlow: Enabling Innovation in Campus Networks", http://www.openflow.org/documents/openflow-wp-latest.pdf, (Mar. 14, 2008).
Higginbotham, Stacey, "Software-defined networking forces Juniper's big shift", http://gigaom.com/2013/01/15/software-defined-networking-forces-junipers-big-shift/, Gigaom, Inc., (Jan. 15, 2013).
Juniper Networks, Inc., "When is the right time to deploy SDN? How about now?", http://www.juniper.net/us/en/dm/sdn/?v=3&utm_source=Tech%20Target%20-%20USA&utm_medium=Banners&utm_content=SDN_Part3_300x250dotswf&utm_campaign=SDN, (1999).

(Continued)

*Primary Examiner* — Brian D Nguyen
(74) *Attorney, Agent, or Firm* — ALG Intellectual Property, LLC (57) ABSTRACT

A computer-implemented method may include identifying a controller-based network. The controller-based network may include a controller that enables centralized management of a flow of packets among devices by providing a centralized control plane for the controller-based network. The method may further include receiving a test scenario that includes at least one trigger capable of causing a fault in the controller-based network. The method may also include receiving an automation template having at least one test parameter for utilizing the centralized control plane to execute the test scenario in the controller-based network. The method may additionally include using the centralized control plane to automatically execute the test scenario on the controller-based network in accordance with the test parameter. Various other apparatuses, systems, methods, and computer-readable media are also disclosed.

20 Claims, 7 Drawing Sheets

(56) References Cited

OTHER PUBLICATIONS

Rouse, Margaret, "software-defined networking (SDN)", http://searchsdn.techtarget.com/definition/software-defined-networking-SDN, TechTarget, (Jun. 18, 2012).

"Open Flow Tutorial", www.openflow.org/wk/index.php/OpenFlow_Tutorial#Download_Files, as accessed Apr. 9, 2013, MediaWiki and WordPress, (May 23, 2011).

* cited by examiner

SYSTEMS AND METHODS FOR TESTING AND ANALYZING CONTROLLER-BASED NETWORKS

BACKGROUND

Traditional techniques for testing network availability and longevity may involve manual network configuration and fault injection. Unfortunately, manual configuration and fault injection may involve a high level of technical expertise and may be time consuming. For a large and/or complex network, fault injection may be particularly difficult. The difficulty may arise, in part, because traditional network switching devices are controlled locally and must be reconfigured individually. Testing a large computing network, therefore, may involve the tedious process of manually and individually reconfiguring numerous switching devices within a network.

Analyzing how a network responds to a fault may be even more difficult than manually injecting faults into a network. For example, a network administrator may attempt to determine why a particular fault causes a particular failure within a network by reviewing routing tables and/or other information that is distributed throughout the switching devices of a network. Making such a determination may be time-prohibitive or even impossible for complicated network failures. Thus, the instant disclosure identifies and addresses a need for improved systems and methods for testing and analyzing computer networks.

SUMMARY

As will be described in greater detail below, the instant disclosure generally relates to systems and methods for testing and/or analyzing controller-based networks. In one example, a computer-implemented method may include identifying a controller-based network. The controller-based network may include a controller that enables centralized management of a flow of packets among devices in the controller-based network by providing a centralized control plane. The method may further include receiving a test scenario that has at least one trigger capable of causing a fault in the controller-based network. The method may also include receiving an automation template that includes at least one test parameter for utilizing the centralized control plane to execute the test scenario in the controller-based network. The method may additionally include using the centralized control plane to automatically execute the test scenario on the controller-based network in accordance with the test parameter. The test scenario may, for example, be automatically executed by a computing system that includes at least one physical processor.

Similarly, a system incorporating the above-described method may include an automation framework. The automation framework may include an identification module that identifies a controller-based network, and the controller-based network may include a controller that enables centralized management of a flow of packets among devices in the controller-based network by providing a centralized control plane for the controller-based network. The automation framework may also include an input module that receives a test scenario having at least one trigger capable of causing a fault in the controller-based network. The input module may also receive an automation template having at least one test parameter for utilizing the centralized control plane to execute the test scenario in the controller-based network. The automation framework may further include a test module that uses the centralized control plane to automatically execute the test scenario on the controller-based network in accordance with the test parameter. The system may also include at least one physical processor configured to execute the automation framework.

A corresponding computer-readable medium may include one or more computer-readable instructions that, when executed by at least one processor of a computing device, cause the computing device to identify a controller-based network having a controller that enables centralized management of a flow of packets among devices in the controller-based network by providing a centralized control plane for the controller-based network. The one or more computer-readable instructions may also cause the computing device to receive a test scenario having at least one trigger capable of causing a fault in the controller-based network and to receive an automation template having at least one test parameter for utilizing the centralized control plane to execute the test scenario in the controller-based network. The one or more computer-readable instructions may further cause the computing device to use the centralized control plane to automatically execute the test scenario on the controller-based network in accordance with the test parameter.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for testing and analyzing controller-based networks, such as software-defined networks and/or data center network fabrics. Embodiments of the instant disclosure may use a centralized control plane of a network to automatically execute test scenarios on the network and/or to analyze how the network responds to test scenarios. The systems and methods of the instant disclosure may also automatically discover a correlation between a test scenario and a response of a network to the test scenario.

As will be explained in greater detail below, embodiments of the instant disclosure may substantially ease the burden of manually testing and analyzing networks. Furthermore, the systems and methods described herein may facilitate the discovery of vulnerabilities and other issues within a network that would otherwise be very difficult, if not impossible, to discover manually. Embodiments of the instant disclosure may also enable test results for one network to be used in analyzing other networks.

Figure 1:
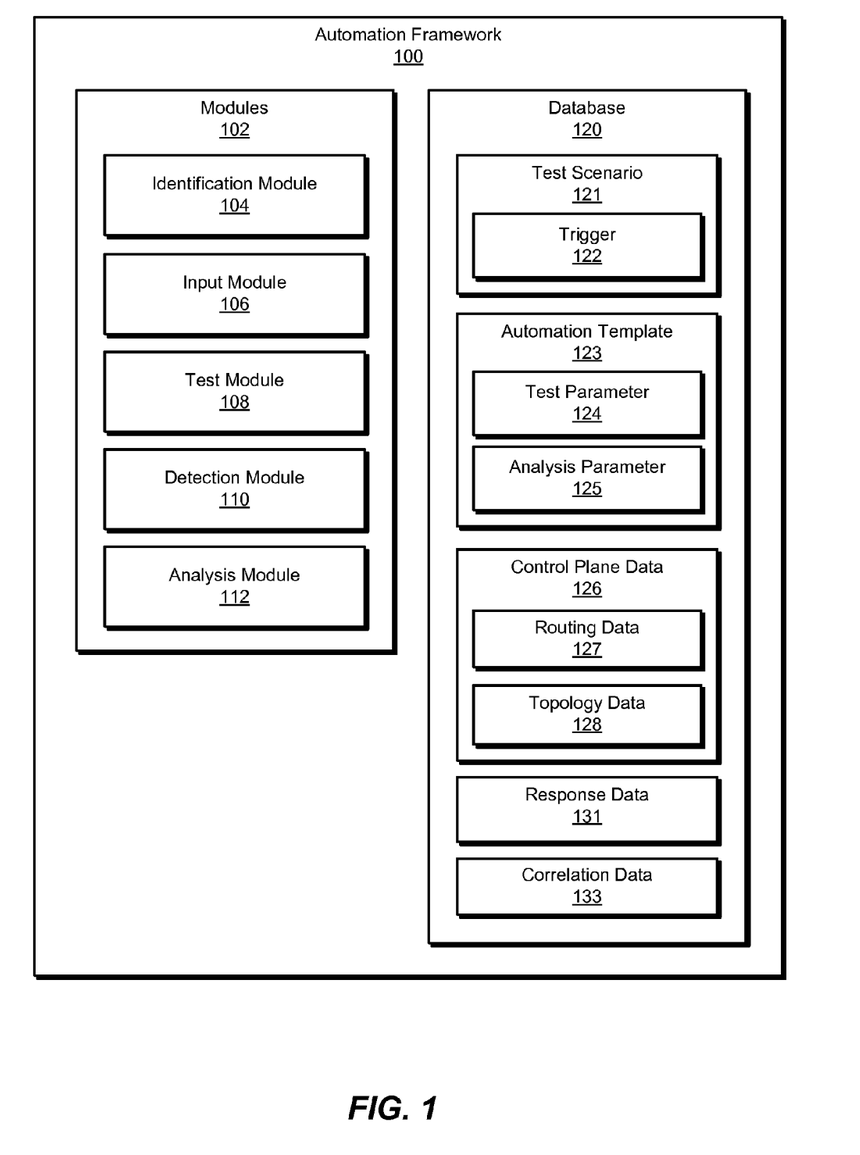
FIG. 1 is a block diagram of an exemplary system for testing and analyzing controller-based networks.
Figure 2:
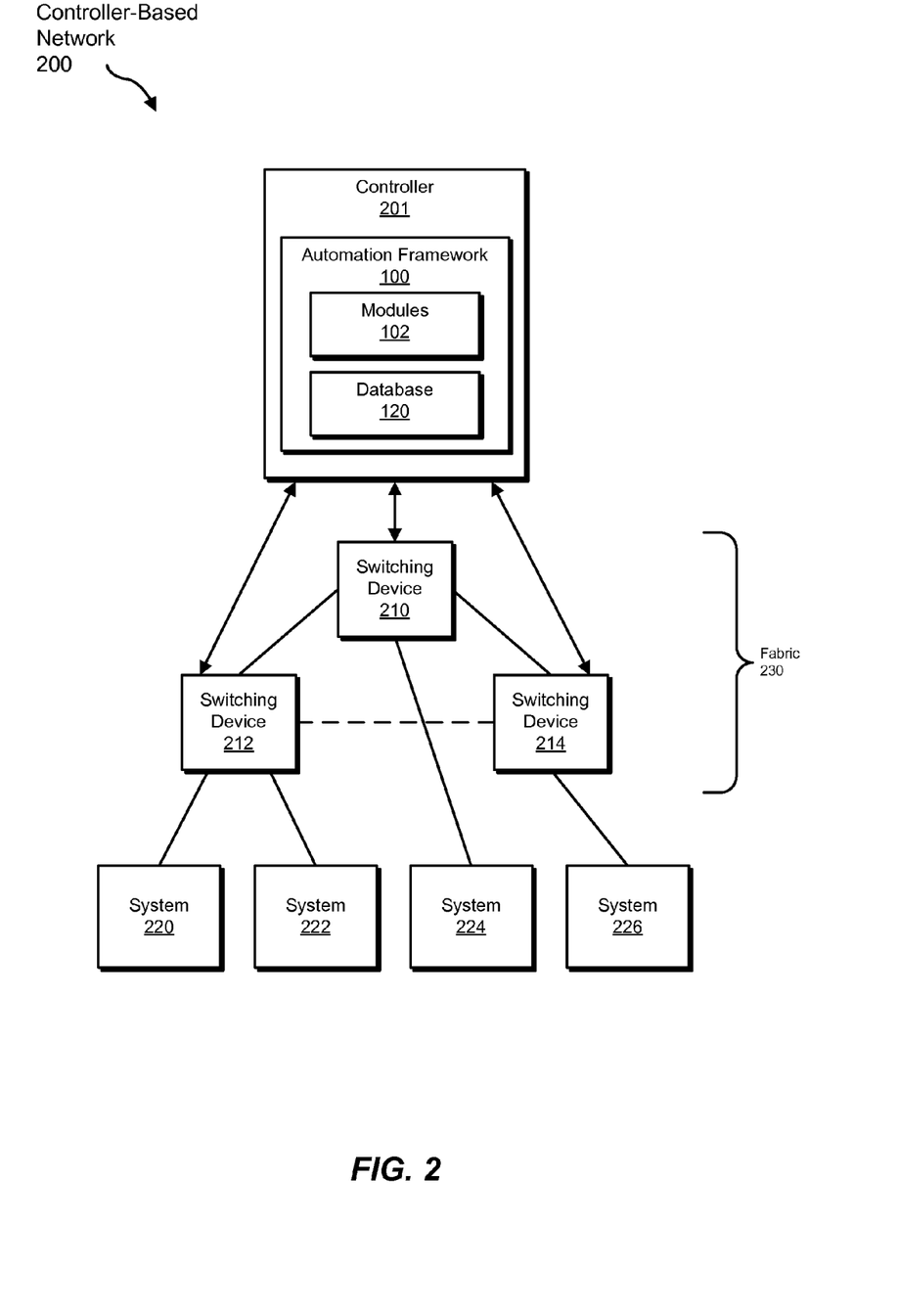
FIG. 2 is a block diagram of an exemplary controller-based network.
Figure 3:
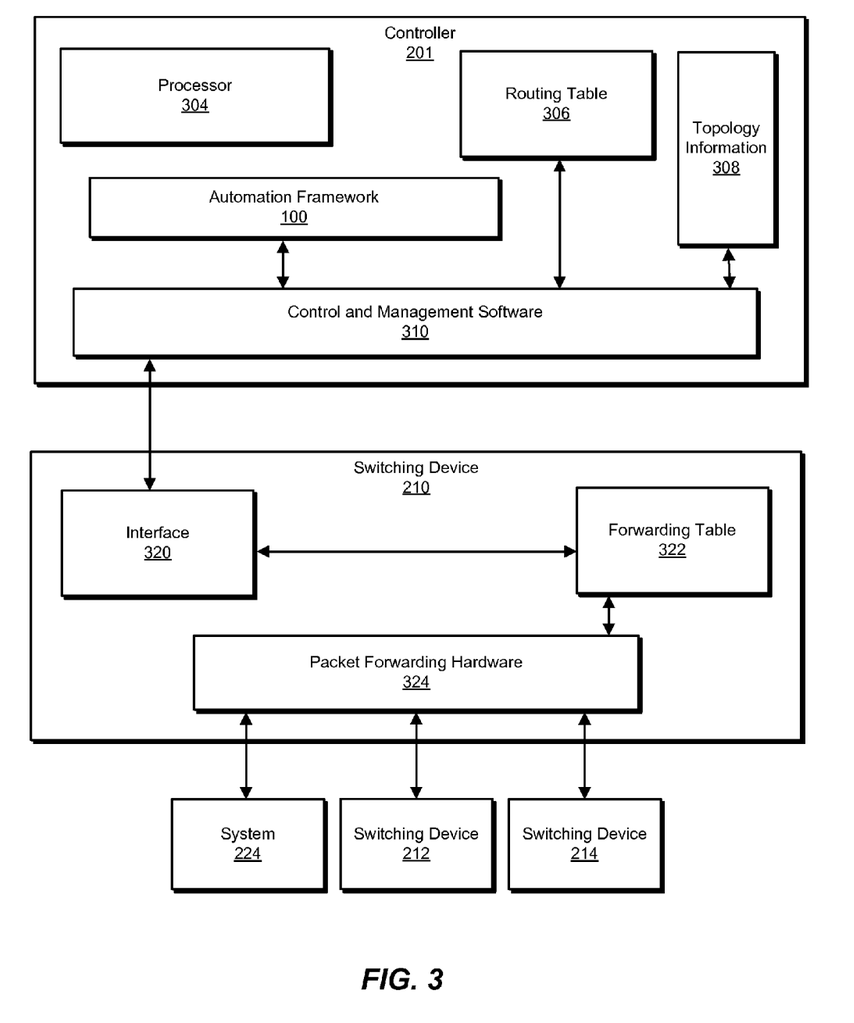
FIG. 3 is a block diagram showing exemplary communications within and between a controller and a switching device of a controller-based network.
Figure 4:
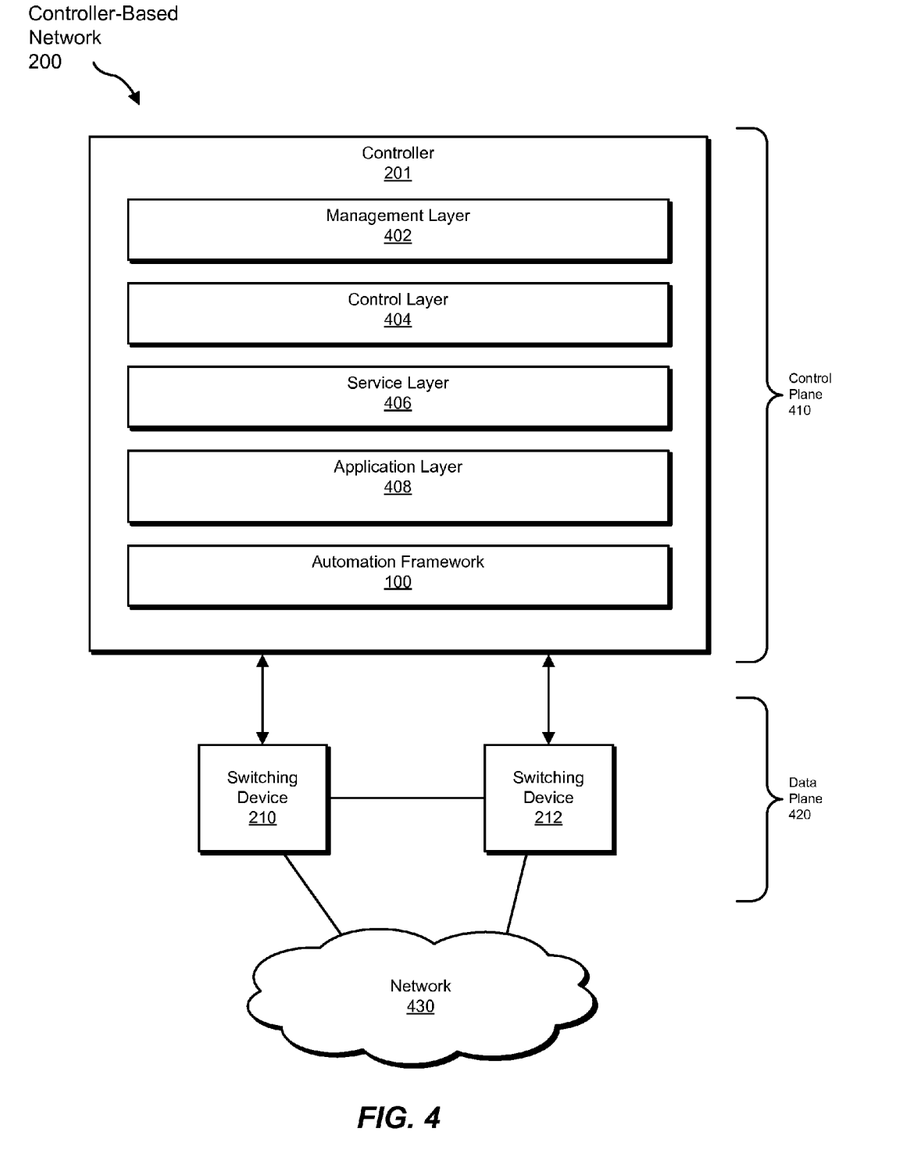
FIG. 4 is a block diagram of exemplary data and control planes of a controller-based network.

The following will provide, with reference to FIGS. 1-4, detailed descriptions of exemplary systems for testing and analyzing controller-based networks. More particularly, the discussion corresponding to FIG. 1 provides a general overview of components of an automation framework for testing and analyzing a controller-based network. The discussion corresponding to FIG. 2 provides a general overview of how an automation framework may operate within a controller of a controller-based network and how the controller may manage switches of a network fabric. The discussion corresponding to FIG. 3 provides details of interactions between a network controller and a switching device, and the discussion corresponding to FIG. 4 provides a conceptual overview of how an automation framework operates within a control plane of a controller-based network. Detailed descriptions of computer-implemented methods performed by the systems shown in FIGS. 1-4 will also be provided in connection with FIGS. 5-6. In addition, detailed descriptions of an exemplary computing system capable of implementing one or more of the embodiments described herein will be provided in connection with FIG. 7.

FIG. 1 is a block diagram of an exemplary automation framework 100 for testing and analyzing controller-based networks. As illustrated in this figure, exemplary automation framework 100 may include modules 102 for performing one or more tasks. For example, and as will be explained in greater detail below, exemplary automation framework 100 may include an identification module 104 that identifies a controller-based network having a controller that enables centralized management of a flow of packets among devices in a controller-based network by providing a centralized control plane. Exemplary automation framework 100 may additionally include an input module 106 that receives a test scenario with at least one trigger capable of causing a fault in the controller-based network. Input module 106 may also receive an automation template that includes at least one test parameter for utilizing the centralized control plane to execute the test scenario in the controller-based network.

Exemplary automation framework 100 may further include a test module 108 programmed to use the centralized control plane to automatically execute the test scenario on the controller-based network in accordance with the test parameter. In addition, and as will be described in greater detail below, exemplary automation framework 100 may include detection module 110 programmed to detect a response of the controller-based network to one or more faults by analyzing the controller-based network during and/or after execution of the test scenario.

Detection module 110 may provide an analysis module 112 with information about the response of the controller-based network. Analysis module 112 may then use the control plane of the controller-based network to automatically identify a correlation between the trigger and the response of the controller-based network. Analysis module 112 may also archive the response of the controller-based network and/or the correlation between the trigger and the response for future reference (e.g., as part of a self-learning process of automation framework 100). For example, if a fault triggers an interesting or useful response, analysis module 112 may store the fault for use (e.g., as a default trigger) in future tests and/or for testing other networks.

Modules 102 of automation framework 100 may automate one or more network testing and/or analysis procedures. As used herein, the term "automatically" generally refers to any action that is performed without user intervention, without user control, without requiring continual user oversight and configuration, and/or without requiring manual user input throughout a testing or analysis procedure.

In certain embodiments, modules 102 in FIG. 1 may represent one or more software applications or programs that, when executed by a computing device, may cause the computing device to perform one or more tasks. For example, and as will be described in greater detail below, modules 102 may represent software modules stored and configured to run on one or more computing devices, such as the devices illustrated in FIGS. 2-4 (e.g., controller 201) and/or portions of exemplary computing system 700 in FIG. 7. Modules 102 in FIG. 1 may also represent all or portions of one or more special-purpose computers configured to perform one or more of the tasks described herein. Although illustrated as separate elements, one or more of modules 102 in FIG. 1 may represent portions of a single module or application.

As illustrated in FIG. 1, exemplary automation framework 100 may also include one or more databases, such as database 120. In one example, database 120 may be configured to store test scenario 121, which may include any type of information used to perform and/or manage testing of a controller-based network. For example, test scenario 121 may include trigger 122, which may provide any type or form of data or code that may trigger a fault in a controller-based network during a test of the controller-based network.

Database 120 may also store one or more automation templates, such as automation template data 123, which may include any parameter or other information used to implement and/or control testing and/or analysis of a controller-based network. Automation template 123 may include, for example, one or more parameters, such as test parameter 124 and analysis parameter 125.

Database 120 may further store control plane data 126, which may include any type or form of data or code related to controlling the movement of packets within a controller-based network. Control plane data 126 may include, for example, routing data 127, which may provide one or more packet routing tables and/or any other type of information related to managing switching devices within a network fabric. Control plane data 126 may also include topology data 128. Topology data 128 may include any information that describes the arrangement of devices and/or connections within a controller-based network.

Database 120 may also include response data 131. Response data 131 may include any type of information about a response of a controller-based network to a fault. Response data 131 may, for example, be generated when detection module 110 detects how a controller-based network responds to a fault. Database 120 may also include correlation data 133. Correlation data 133 may include any type of information that identifies and/or describes a connection between a test scenario and a response of a controller-based network to a fault. Correlation data 133 may, for example, be generated when analysis module 112 analyzes response data 131 to determine a correlation between test scenario 121 and a response of a controller-based network to the test scenario.

Database 120 may represent portions of a single database or computing device or a plurality of databases or computing devices. For example, database 120 may represent a portion of controller 201 in FIGS. 1-4 and/or portions of exemplary computing system 700 in FIG. 7. Alternatively, database 120 in FIG. 1 may represent one or more physically separate devices capable of being accessed by a computing device, such as controller 201 in FIGS. 1-4 and/or portions of exemplary computing system 700 in FIG. 7.

Automation framework 100 in FIG. 1 may be implemented in a variety of ways. In some embodiments, all or a portion of automation framework 100 may represent portions of the networks, systems, and devices shown in FIGS. 2-4. For example, automation framework 100 may operate within a controller-based network. As used herein, the phrase "controller-based network" generally refers to any network system and/or fabric with centralized control. As described in greater detail below, controller-based networks may decouple network data and network control such that a portion (or all) of a control plane may be provided at a central location remote from a data plane. For example, a controller-based network may include a self-aware network system, such as a software-defined network, that manages an entire network topology automatically (e.g., without user input and/or control) in real time. Additionally or alternatively, a controller-based network may include a flat, fabric-based network architecture, such as a data center network fabric.

As used herein, the phrase "software-defined network" generally refers to a network with one or more switching devices that can be configured by a centralized controller. As such, a software-defined network may provide a scalable infrastructure with Application Programming Interface (API) support that enables virtualized services for automation and control of the software-defined network. For example, a software-defined network may provide elastic management of IP-based virtual network and security services, which may enhance the efficiency and agility of network deployment and utilization.

As used herein, the phrase "data center network fabric" generally refers to a network switching fabric that may function as a single, logical device. For example, a data center network fabric may provide a flat architecture that eliminates the need for multiple layers of devices, switch-to-switch interactions, and/or shared network protocols. As a result, a data center network fabric may facilitate a high level of scalability by providing any-to-any connectivity among nodes (e.g., switching devices) within the data center network fabric. In some embodiments, all or a portion of a data center network fabric may be implemented within a software-defined network. Alternatively, all or a portion of a software-defined network may be implemented within a data center network fabric.

FIG. 2 illustrates how automation framework 100 may communicate with devices and/or applications of a controller-based network 200 via a controller 201. As shown in FIG. 2, controller 201 may be configured with automation framework 100. Controller 201 may control and/or manage data flow between systems 220-226 through switching devices 210, 212, and 214. When controller-based network 200 is implemented as a software-defined network, switching devices 212 and 214 may be connected via switching device 210. When controller-based network 200 is implemented as a data center network fabric, in addition to being connected to switching device 210, switching devices 212 and 214 may be logically connected to each other, as represented by the dotted line between switching devices 212 and 214. While FIG. 2 shows four systems connected via three switching devices, controller-defined network 200 may include many more and/or fewer switching devices and/or systems.

The term "controller," as used herein, generally refers to any type or form of device or system capable of managing and controlling, in a centralized manner, the movement of information within a computing network. Controller 201 may, for example, be a dedicated special-purpose device capable of running software for the centralized management and control of packets within a software-defined network and/or a data center network fabric. Alternatively, controller 201 may be a virtual machine or other software that is executed on a general purpose computing device and/or a networking device that provides functions in addition to centralized network management. For example, controller 201 may be implemented as a director within a data center network fabric. As described in greater detail below, automation framework 100 may leverage the functionality of controller 201 to test and/or analyze controller-based network 200.

The term "switching device," as used herein, generally refers to any device, system, or application capable of routing or forwarding information, which may be in the form of packets, among devices of a computing network. Examples of switching devices include, without limitation, any suitable type or form of network hubs, switches, bridges, and/or routers.

Systems 220-226 generally represent any type or form of computing device capable of reading computer-executable instructions. Examples of systems 220-226 include, without limitation, laptops, tablets, desktops, servers, cellular phones, Personal Digital Assistants (PDAs), multimedia players, embedded systems, switching devices, combinations of one or more of the same, exemplary computing system 700 in FIG. 7, or any other suitable computing device. Additionally or alternatively, systems 220-226 may include application servers, database servers, and/or any other suitable type of server configured to provide various network-based database and/or application services.

As shown in FIG. 2, switching devices 210, 212, and 214 may be referred to as a fabric 230. As used herein, the term "fabric" generally refers to any type or form of switched fabric network topology that interconnects nodes (e.g., systems) via one or more switching devices (e.g., crossbar switches, fibre channel switches, etc.).

FIG. 3 shows how various components of controller 201 and a switching device (switching device 210) may communicate. As shown in FIG. 3, in addition to automation framework 100, controller 201 may include a processor 304, a routing table 306, topology information 308, and network control and management software 310. FIG. 3 also shows that switching device 210 may include a controller-based network interface 320, a forwarding table 322, and packet forwarding hardware 324.

Control and management software 310 may include a network operating system, applications, and/or any other software capable of providing various control and management functions for controller-based network 200. For example, control and management software 310 may manage routing table 306 and may use routing table 306 to compile forwarding information to send to a switching device, such as switching device 210. Control and management software 310 may then deliver the forwarding information to switching device 210 via interface 320, and switching device 210 may store the forwarding information in forwarding table 322. Switching device 210 may use forwarding table 322 to direct packet forwarding hardware 324 to forward data packets to system 224, switching device 212, and/or switching device 214.

In some embodiments, automation framework 100 may execute on processor 304 and may run on top of, and in communication with, control and management software 310. Automation framework 100 may obtain routing data and/or topology data about controller-based network 200 by querying control and management software 310. Control and management software 310 may, in response to the query, access routing table 306 and/or topology information 308 and may provide automation framework 100 with the requested information. Automation framework 100 may then store the information in database 120 as routing data 127 and/or topology data 128.

The functionality of controller-based network 200 may be logically categorized into different planes, as shown in FIG. 4. The term "plane," as used herein, generally refers to a conceptual layer of operation within a computing network. FIG. 4 shows controller-based network 200 divided into a control plane 410 and a data plane 420. The phrase "control plane," as used herein, generally includes any hardware, software, protocol, and/or connection involved in the management and/or control of data flow (e.g., routing of packets) within a computing network.

In traditional computing networks, all or a portion of a network control plane may be distributed across network devices and systems. For example, in traditional networks, configuration and management of routing tables may be performed on individual switching devices. In contrast, in a controller-based network, functionality of the control plane may be partially or completely removed from switching devices and centralized at a controller. Thus, control plane 410 may be said to be removed from, distinct from, and/or remote from data plane 420.

FIG. 4 shows that data plane 420 is distinct from control plane 410. The phrase "data plane," as used herein, generally refers to any hardware, software, and/or system for forwarding data, such as packets, among devices and/or systems of a network. As shown in FIG. 4, data plane 420 may include, for example, switching devices 210 and 212. Data plane 420 may also include any suitable number of additional switching devices, and the switching devices of data plane 410 may switch data among other systems and devices, represented in FIG. 4 as network 430.

As shown in FIG. 4, control plane 410 may include controller 201. In some embodiments, control plane 410 may be implemented and/or managed solely by controller 201. In other embodiments, control plane 410 may include one or more computing systems, components, and/or devices in addition to controller 201.

In some embodiments, functional layers within controller 201 may be conceptualized as management layer 402, control layer 404, service layer 406, and application layer 408. Management layer 402 may provide network device management, such as firmware updates, to switching devices 210 and 212. Management layer 402 may implement any suitable protocol, such as a Simple Network Management Protocol (SNMP) and/or may implement external configuration via a command line interface.

Control layer 404 may include routing tables and/or routing algorithms for generating and/or changing routing tables (i.e., lists of routes to systems connected to a network). Control layer 404 may implement routing protocols, such as a Border Gateway Protocol (BGP) and/or an Open Shortest Path First (OSPF) protocol within controller-based network 200 to manage routing within controller-based network 200.

Service layer 406 may provide one or network services within controller-based network 200. For example, service layer 406 may carry and/or route firewall data, network traffic analysis data, and/or network security data. Application layer 408 may include any type or form of network-based application. Such applications may include, but are not limited to, operating systems, virtual machines, daemons, and/or any other software configured to execute within the context of a controller-based network.

By implementing all or a portion of control plane 410 in centralized controller 201, controller 201 may be enabled to make centralized routing decisions for directing a flow of packets within controller-based network 200. Controller 201 may communicate these routing decisions to devices within controller-based network 200, such as switching devices 210 and 212. Thus, for example, all communication among devices within controller-based network 200 may be managed through controller 201.

As shown in FIG. 4, in addition to layers 402-408, controller 201 may include automation framework 100. Automation framework 100 may communicate with, coordinate with, and/or otherwise work with management layer 402, control layer 404, service layer 406, and/or application layer 408 of controller 201. As explained in greater detail below in the discussion of FIGS. 5 and 6, automation framework 100 may coordinate with one or more other layers of control plane 410 to test and/or analyze controller-based network 200.

Figure 5:
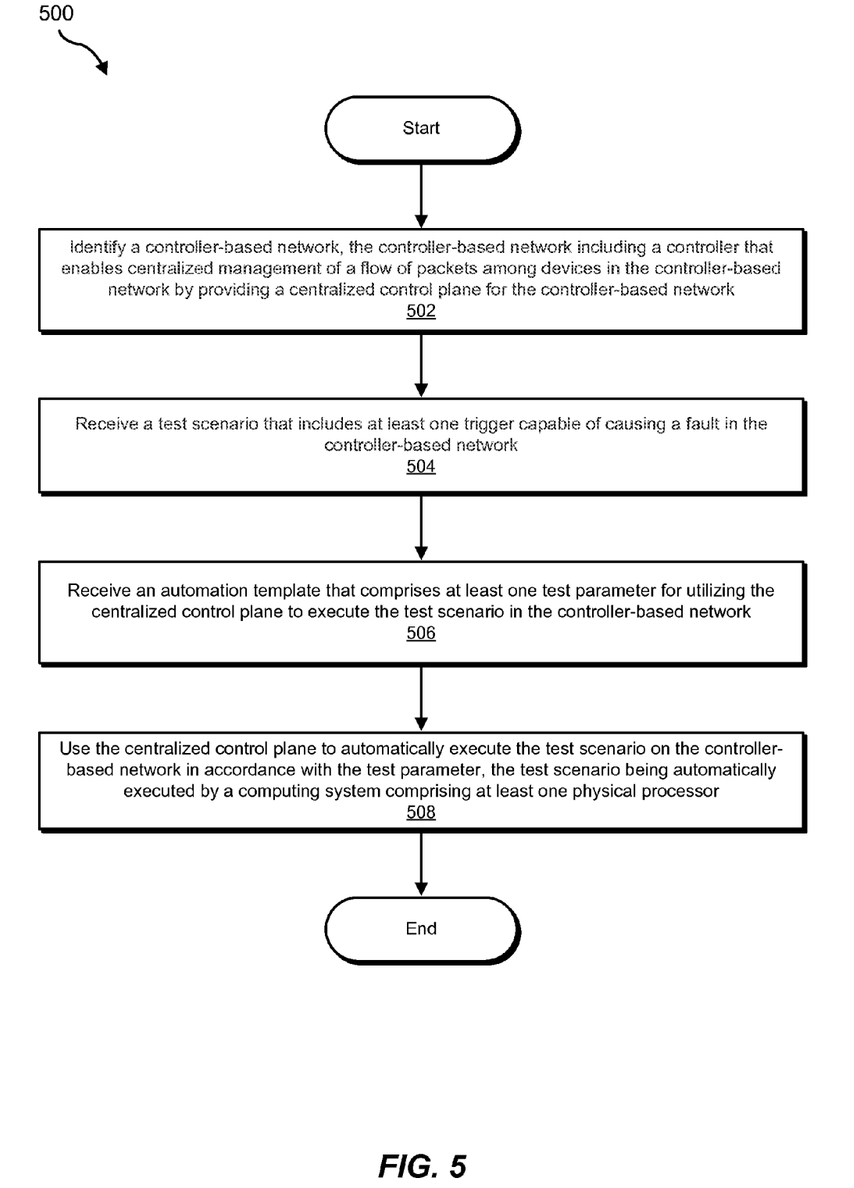
FIG. 5 is a flow diagram of an exemplary method for automated testing of a controller-based network.
Figure 6:
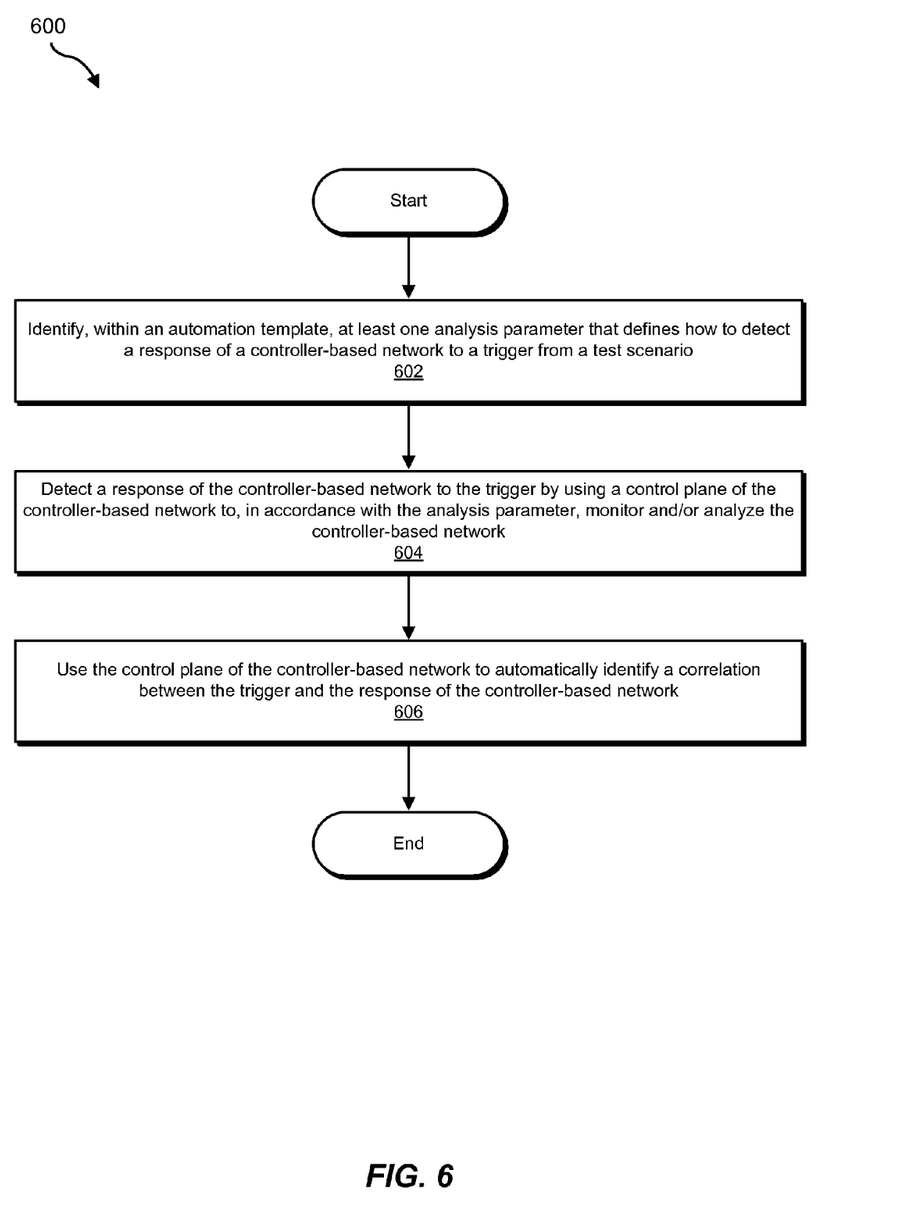
FIG. 6 is a flow diagram of an exemplary method for automated analysis of a controller-based network.

As explained above, embodiments of the instant disclosure may take advantage of the centralized management provided by centralized network controllers to test and/or analyze controller-based networks. FIGS. 5 and 6 show methods that involve utilizing one or more of the components shown in FIGS. 1-4 for testing and/or analyzing controller-based networks. In particular, FIG. 5 illustrates a method 500 for using a test scenario and an automation template to test a controller-based network, and FIG. 6 shows an example 600 detecting and analyzing a network's response to a test scenario.

Turning to FIG. 5, at step 502 one or more of the systems described herein may identify a controller-based network. For example, identification module 104 may identify controller-based network 200. Identification module 104 may identify controller-based network 200 in any suitable manner and/or in response to any type of trigger. For example, identification module 104 may, as part of automation framework 100, identify controller-based network 200 by communicating with one or more layers of control plane 410. Additionally or alternatively, identification module 104 may identify controller-based network 200 upon being installed to controller 201. In some embodiments, identification module 104 may identify controller-based network 200 in response to a request to test and/or analyze controller-based network 200.

Identification module 104 may also identify controller-based network 200 by identifying any information associated with controller-based network 200. For example, identification module 104 may identify topology data 128 of controller-based network 200. Identification module 104 may identify, within topology data 128, information that identifies each device (or a subset of devices, such as one or more of switching devices 210, 212, and 214 and/or systems 220, 222, 224, and 226) within controller-based network 200. Additionally or alternatively, identification module 104 may identify, within topology data 128, information that identifies network connections (e.g., physical and/or wireless connections) between devices within controller-based network 200.

At step 504 in FIG. 5, one or more of the systems described herein may receive a test scenario that includes at least one trigger capable of causing a fault in the controller-based network. For example, input module 106 may receive test scenario 121, which may include a trigger (e.g., trigger 122) capable of causing a fault in controller-based network 200.

Input module 106 may receive a test scenario in a variety of ways. For example, input module 106 may query a database of automation framework 100, such as database 120, for a default test scenario. In response to the query, input module 106 may receive a set of triggers and/or other test information from database 120. Additionally or alternatively, input module 106 may receive test scenario information from a user (e.g., information provided by a user through an input/output interface to controller 201), from a remote computing device, and/or from any other suitable source.

The phrase "test scenario," as used herein, generally refers to any type or form of action or input, defined by one or more parameters, executable code, and/or other data, that may be used to perform and/or manage network tests. In some embodiments, a test scenario may include network data flow parameters, settings, and/or information that cause a flow of packets within a network to change. For example, test scenario 121 may contain information that, when utilized during a test, results in creation and/or alteration of one or more routing tables and/or forwarding tables within controller-based network 200. Additionally or alternatively, test scenario 121 may define an alternative physical arrangement of devices and/or device connections within controller-based network 200 by, for example, providing instructions to add, remove, and/or modify one or more devices and/or device connections within controller-based network 200.

As indicated, a test scenario may include trigger data that triggers a fault within a controller-based network. The term "trigger" generally refers to any action, code, and/or data that may cause and/or simulate a fault in a network. The term "fault" generally refers to any malfunction, anomaly, decrease in performance, connectivity problem, packet flow problem, network cable failure, network device failure, system services failure, virus outbreak, and/or other network issue that has the potential to disrupt services provided by a network.

Returning to FIG. 5, at step 506 one or more of the systems described herein may receive an automation template. For example, test module 108 may receive automation template 123, which may define how one or more of the layers of control plane 410 may be utilized to execute one or more test scenarios in controller-based network 200.

Test module 108 may receive automation template 123 in a variety of contexts and/or manners. For example, test module 108 may receive automation template data 123 (e.g., test parameter 124 and/or analysis parameter 125) from database 120. Additionally or alternatively, automation template data 123 may be received from a user (e.g., information provided by a user through an input/output and/or user interface to controller 201), from a remote computing device, and/or from any other suitable source. For example, test module 108 may receive automation template 123 by receiving, from a user, a selection of a plurality of custom and/or default test scenarios and/or triggers that are to be injected (e.g., executed within) controller-based network 200. Test module 108 may additionally receive, from the user, an indication of a priority for executing each test scenario and/or injecting each trigger during execution of test scenario 121.

In some embodiments, test module 108 may receive automation template 123 as part of and/or at the same time as test scenario 121. Alternatively, automation template 123 and test scenario 121 may be received separately and/or at different times.

The phrase "automation template" generally refers to any type or form of information or parameter, such as a test parameter and/or an analysis parameter, that may be used to implement and/or control automated testing and/or analysis of a network. For example, an automation template may define how a centralized control plane may be used to execute a test scenario in a controller-based network.

The phrase "test parameter" generally refers to any parameter and/or setting that may be used by an automation framework (or other testing software) in automatically executing tests on a controller-based network. In some embodiments, a test parameter may define a duration of time for running a test scenario, a starting time for running a test scenario, and/or an ending time for running a test scenario. For example, a test parameter may define a schedule for executing tests on a network (e.g., on a daily, weekly, monthly basis). Additionally or alternatively, a test parameter may define a portion of a network to be tested, particular devices that are to be tested, and/or particular connections that are to be tested.

A test parameter may also identify one or more test scenarios that are to be executed on a network. For example, a test parameter may identify a set of test scenarios to be executed on a network, an order of executing test scenarios on a network, whether test scenarios and/or triggers are to be executed on a continuous or random basis, and/or any other information that defines how test scenarios are to be used in testing a network. Additionally or alternatively, a test parameter may include default and/or user-defined network protocols to be used for network testing and/or traffic patterns to be used for testing.

In some embodiments, a user may define or select a test parameter that indicates a time limit for testing a network. In response, automation framework 100 may automatically determine whether test scenarios and/or triggers selected by the user will be able to be executed within the timeframe defined by the user. If the timeframe defined by the user is greater than the time needed to execute the selected tests, test module 108 may loop through the tests until the time limit is reached. If the timeframe is less than the time needed to execute the selected tests, test module 108 may request that the user indicate a priority for attempting to execute the tests. If a timeframe is not defined or is designated as infinite, test module 108 may inject all known test scenarios and/or triggers until a user aborts testing.

Test parameter 124 may include a parameter that enables test module 108 to leverage the centralized nature of control within controller-based network 200 to perform tests on controller-based network 200. In other words, as shown at step 508 in FIG. 5, one or more of the systems described herein may use a centralized control plane to automatically execute a test scenario on the controller-based network in accordance with the test parameter. For example, test module 108 may use control plane 410 to automatically execute test scenario 121 on controller-based network 200 in accordance with test parameter 124 of automation template 123.

Test module 108 may execute test scenario 121 in any suitable manner, timeframe, and/or context. For example, test parameter 124 may define a schedule for executing test scenario 121, and test module 108 may execute test scenario 121 in accordance with the schedule. As another example, test parameter 124 may identify test scenario 121 as part of a set of test scenarios to be executed, and test module 108 may execute test scenario 121 as part of executing each test scenario in the set of test scenarios.

In some embodiments, test parameter 124 may provide information about control plane 410, and test module 108 may use the information about control plane 410 to execute test scenario 121. For example, test parameter 124 may provide information that identifies a location of one or more routing tables of control plane 410, and test module 108 may use the information to locate the routing tables. Test module 108 may then manipulate the routing tables in accordance with test scenario 121. As another example, test module 108 may use test parameter 124 to locate topology information stored on controller 201 and may use the topology information to implement test scenario 121.

Test module 108 may execute test scenario 121 in a variety of ways. In some embodiments, test module 108 may coordinate with control plane 410 to simulate failure of a network component of controller-based network 200. For example, when test scenario 121 defines a switching device failure trigger, test module 108 may use control plane 410 to simulate failure of a switching device (e.g., switching device 210) by manipulating routing information (e.g., by changing a routing table) and/or other control information stored on controller 201. As another example, when test scenario 121 defines a failure of a communication mechanism (e.g., a network cable or other hardware) between switching device 210 and system 224, test module 108 may use control plane 410 to simulate the failure of the communication mechanism by manipulating routing and/or other control information stored on controller 201.

As previously noted, in addition to running tests on controller-based networks, the systems and method described herein may detect and analyze responses of controller-based networks to the tests. For example, at step 602 in FIG. 6, one or more of the systems defined herein may identify, within an automation template, at least one analysis parameter that defines how to detect a response of a controller-based network to a trigger from a test scenario. For example, input module 106 may identify analysis parameter 125 within automation template 123.

Input module 106 may identify analysis parameter 125 in any suitable manner. For example, input module 106 may identify analysis parameter 125 in response to querying database 120 for analysis parameters and/or by receiving analysis parameter 125 from a user.

As used herein, the phrase "analysis parameter" generally refers to any type or form of parameter or setting that defines how and/or when a network response to a trigger should be analyzed. Analysis parameters may include, but are not limited to, parameters indicating whether to monitor or analyze a response of a network, when to monitor or analyze a response of a network, which types of responses are to be analyzed (e.g., graceful, ungraceful, catastrophic, etc.), and/or when to pause or terminate execution of a test scenario.

At step 604 in FIG. 6, one or more of the systems described herein may detect a response of the controller-based network to the test scenario by using a control plane to, in accordance with the analysis parameter, monitor and/or analyze the controller-based network. For example, detection module 110 may use control plane 410 to detect a response of controller-based network 200 to one or more triggers of test scenario 121.

The term "response," as used herein, generally refers to any reaction or consequence in a network resulting from any change in network configuration, fault in a network, and/or failure within a network. In some embodiments, a response may include any adaptation of controller-based network 200 to a test scenario. For example, controller-based network 200 may successfully respond to a fault caused by test scenario 121 by rerouting data. In other embodiments, a response may include a failure within controller-based network 200 and/or a failed attempt of controller-based network 200 to recover from a fault. In such situations, a response may include dropped packets, packet congestion, delayed packet delivery, disruption in a flow of packets, and/or instability of all or a portion of controller-based network 200.

Detection module 110 may detect a response of controller-based network 200 in any suitable manner. According to certain embodiments, detection module 110 may use control plane 410 to monitor, in accordance with analysis parameter 125, controller-based network 200 during execution of test scenario 121. For example, analysis parameter 125 may indicate a timeframe during which controller-based network 200 should be monitored, and in response, detection module 110 may monitor controller-based network 200 during the indicated timeframe. As another example, detection module 110 may detect the response of controller-based network 200 by detecting traffic anomalies in controller-based network 200 and/or by monitoring stability of one or more systems (e.g., switching devices) within controller-based network 200.

Additionally or alternatively, detection module 110 may use control plane 410 to examine, in accordance with the test parameter, controller-based network 200 before and/or after execution of the test scenario, execution of each trigger in the test scenario, and/or detection of each fault caused by the test scenario. For example, detection module 110 may monitor for and detect each fault in controller-based network 200 and may examine controller-based network 200 before and after each fault detection.

Detection module 110 may leverage information managed and/or stored by control plane 410 to obtain a view into how controller-based network 200 operates. For example, detection module 110 may use routing data 127 and/or topology data 128 as a roadmap for examining and/or analyzing controller-based network 200. As another example, detection module 110 may use routing data 127 and/or topology data 128 to identify network nodes and/or connections to monitor or examine.

After detection module 110 detects the response of controller-based network 200, analysis module 112 may determine that the response exceeds a predetermined failure-tolerance level defined by analysis parameter 125. The failure-tolerance level may be a default tolerance level and/or a user-defined tolerance level and may indicate any suitable level of fault tolerance (e.g., minor, major, catastrophic, etc.) for executing test scenario 121. For example, analysis parameter 125 may indicate that test scenario 121 should be allowed to continue to execute if controller-based network 200 gracefully recovers from a fault (e.g., if controller-based network 200 continues to operate after a fault, e.g., by failing over from a network path affected by the fault to a network path that is not affected by the fault.)

As another example, a failure-tolerance level may indicate that testing should be paused or terminated if a catastrophic failure is detected. In this example, if end-to-end traffic in controller-based network 200 does not recover after a fault, analysis module 112 may pause or terminate execution of test scenario 121 and may send a notification (e.g., via email) to a network administrator or other user indicating one or more failures and/or anomalies within controller-based network 200.

Execution of test scenario 121 may be paused or terminated for a variety of reasons. In some embodiments, pausing or terminating execution of test scenario 121 may prevent further actions or interactions that would make it difficult for a user to understand results of testing and analysis. In some situations, pausing or terminating execution of test scenario 121 may allow for deeper debugging and/or analysis of controller-based network 200.

Returning to FIG. 6, at step 606 one or more of the systems described herein may use the control plane of the controller-based network to automatically identify a correlation between the trigger and the response of the controller-based network. For example, analysis module 112 may use control plane 410 of controller-based network 200 to automatically identify a correlation between a trigger 122 and a response of controller-based network 200 to trigger 122.

Analysis module 112 may identify a correlation between a trigger and a response of controller-based network 200 in any suitable manner. In some embodiments, analysis module 112 may use routing data 127 and/or topology data 128 to trace trigger 122 to a response to trigger 122. For example, analysis module 112 may review routing data 127 and may determine that a trigger can be traced to a failover response of controller-based network 200.

In certain embodiments, analysis module 112 may determine how a trigger caused a response by automatically identifying and analyzing information in the control plane that is indicative of how packets are switched within controller-based network 200. For example, analysis module 112 may automatically identify and analyze information in control plane 410 that is indicative of how packets are switched within controller-based network 200.

According to some embodiments, analysis module 112 may determine how a trigger caused a response by discovering and analyzing a topology of a controller-based network. For example, analysis module 112 may identify an arrangement of the devices within controller-based network 200 by accessing topology data 128. Analysis module 112 may use the arrangement of the devices within the controller-based network to trace a trigger to a response of controller-based network 200.

Analysis module 112 may discover and utilize various types of topological data in analyzing a network. Topological data may include, without limitation, information describing the number of physical and/or virtual devices in a network, the types of devices in a network, the configuration of connections between devices in a network, and/or distances (e.g., number of hops) between devices in a network.

Analysis module 112 may also determine how a trigger caused a response by discovering and analyzing information related to coordination of the flow of packets among devices within controller-based network 200. For example, analysis module 112 may discover, on controller 201, information related to coordination of the flow of packets among devices within a routing table (e.g., routing table 306) on controller-based network 200. Additionally or alternatively, analysis module 112 may discover, on controller 201, information used to avoid congestion, such as information for redirecting one or more packets when a routing path is already experiencing high traffic. Similarly, analysis module 112 may discover, on controller 201, information indicating that controller 201 has directed a delay in packet delivery to avoid overloading a particular device by pacing packet delivery.

Analysis module 112 may use information about the flow of packets in controller-based network 200 in evaluating how and/or why controller-based network 200 responded to a particular trigger. For example, analysis module 112 may identify load balancing information on controller 201 in evaluating why controller-based network 200 redirected data in response to a trigger that caused high traffic across certain paths in controller-based network 200.

Analysis module 112 may save information about the correlation between a trigger and a response as correlation data 133 in database 120. Correlation data 133 may then be later used and/or evaluated to identify and correct potential problems within controller-based network 200. Correlation data 133 may also be used in designing, deploying, and/or evaluating other networks.

Embodiments of the instant disclosure provide an automation framework for implementing networking tests such that, during development of network software, an entire set of tests may be executed multiple times without user control and/or input. The systems and methods described herein may also be topology independent, which may facilitate replicating and re-using an automation framework, including test scenarios and templates, in different customer environments with various network topologies.

As part of a control plane, an automation framework may be abstracted from particular details, such as hardware configuration, of specific devices with which the automation framework interacts. Accordingly, an automation framework may be implemented within various and diverse software-defined networks with widely different topological arrangements. An automation framework may be implemented, for example, within a distributed network including closely tied computing devices, such as enterprise networks and/or mainframe computers. As another example, an automation framework may be implemented in a cloud-based network including a wide variety of loosely connected devices, such as laptops, smartphone, desktops, tablets, and servers. As a result, automation framework 100 may offer substantially greater flexibility than traditional testing and/or analysis solutions.

Access to centralized information in a control plane may enable an automation framework to perform various types of testing and analysis that would be difficult, if not impossible, to achieve manually. For example, an automation framework 100 may enable highly accelerated lifetime testing of a network using a variety of traffic types to perform high availably and longevity tests that may be unfeasible to perform manually. In other words, tests performed by an automation framework may be much faster and more efficient than manual tests. Furthermore, an automation framework may operate for extended periods of time without interruption. An automation framework may also facilitate testing and analysis of responses to test scenarios in which the responses include complex chains of causation.

Figure 7:
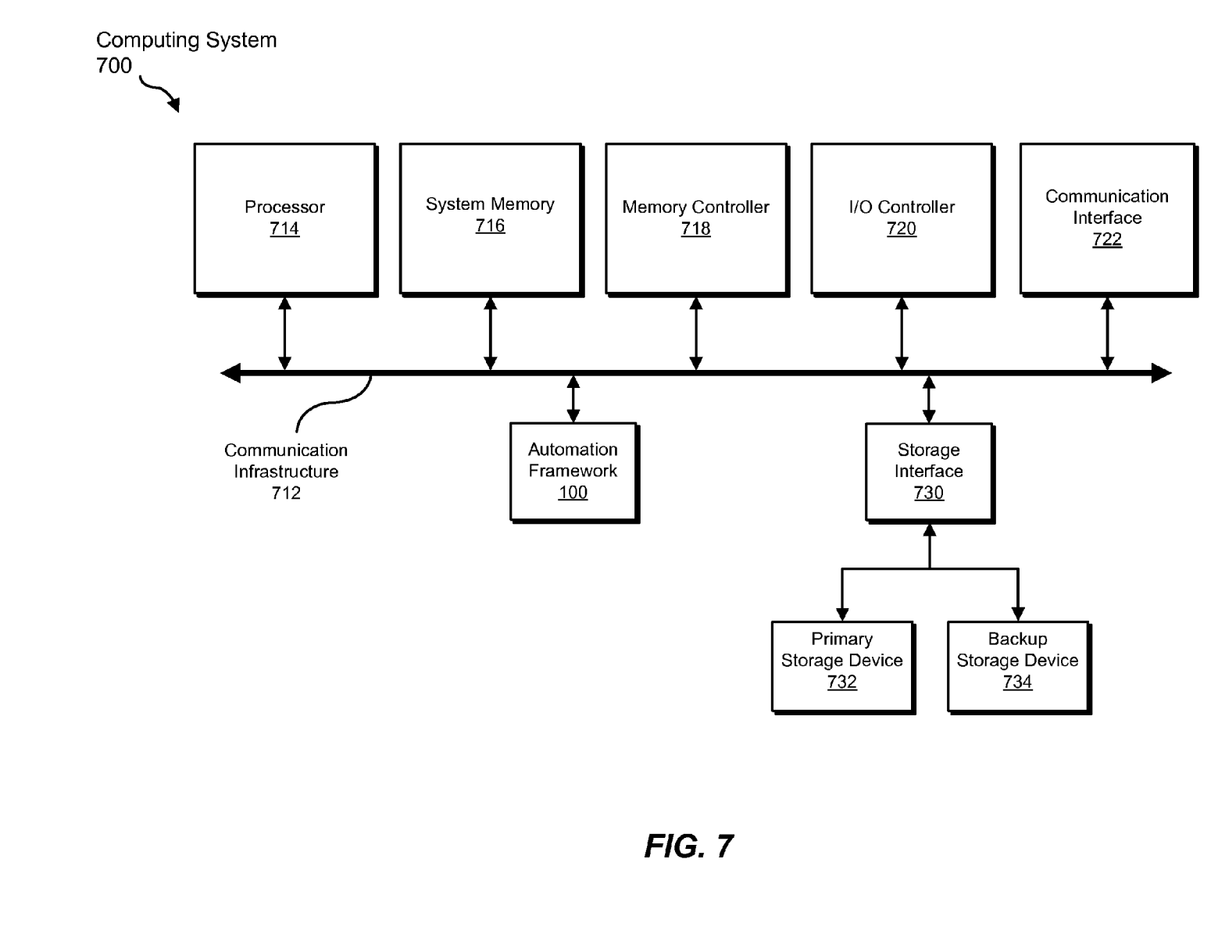
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIGS. 5 and 6. All or a portion of computing system 700 may also perform and/or be a means for performing and/or implementing any other steps, methods, or processes described and/or illustrated herein. In one example, computing system 700 may include automation framework 100 from FIG. 1. In other words, computing system 700 may be, or may be a part of, a controller, such as controller 201.

Computing system 700 broadly represents any type or form of computing device, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. Processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of power-redundant system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying a controller-based network, the controller-based network comprising a controller that enables centralized management of a flow of packets among devices in the controller-based network by providing a centralized control plane for the controller-based network;
    receiving a test scenario comprising at least one trigger that causes a fault in the controller-based network;
    receiving an automation template that comprises at least one test parameter for utilizing the centralized control plane to execute the test scenario in the controller-based network; and
    using the centralized control plane to automatically execute the test scenario on the controller-based network in accordance with the test parameter, the test scenario being automatically executed by a computing system comprising at least one physical processor.

2. The method of claim 1, wherein:
    the controller-based network comprises a software-defined network;
    a data plane of the controller-based network comprises a programmable switching device that is remotely programmed by the controller; and
    the centralized control plane is decoupled from the data plane of the controller-based network.

3. The method of claim 1, wherein the controller-based network comprises a data center network fabric that provides any-to-any connectivity among switching devices within the data center network fabric.

4. The method of claim 1, further comprising:
identifying, within the automation template, at least one analysis parameter that defines how to detect a response of the controller-based network to the trigger from the test scenario; and
detecting the response of the controller-based network to the trigger by performing at least one of:
monitoring the controller-based network during execution of the test scenario, and
analyzing the controller-based network after execution of the test scenario.

5. The method of claim 4, wherein:
the test scenario comprises a plurality of triggers, and each trigger in the plurality of triggers causes one or more faults in the controller-based network; and
detecting the response of the controller-based network comprises automatically analyzing a state of the controller-based network after each fault in the controller-based network.

6. The method of claim 4, further comprising using the centralized control plane of the controller-based network to automatically identify a correlation between the trigger and the response of the controller-based network.

7. The method of claim 6, wherein using the centralized control plane of the controller-based network to automatically identify the correlation between the trigger and the response further comprises:
identifying information in the centralized control plane that is indicative of how packets are switched within the controller-based network; and
analyzing the information indicative of how packets are switched to automatically identify the correlation between the trigger and the response.

8. The method of claim 7, wherein:
the response is a disruption in the coordination of the flow of packets among devices of the controller-based network; and
identifying information in the centralized control plane that is indicative of how packets are switched within the controller-based network comprises analyzing the information related to the coordination of the flow of packets to determine how the trigger caused the disruption in the coordination of the flow of packets.

9. The method of claim 6, wherein using the centralized control plane of the controller-based network to automatically identify the correlation between the trigger and the response further comprises:
discovering a topology of the controller-based network by identifying an arrangement of the devices within the controller-based network; and
analyzing the arrangement of the devices within the controller-based network to automatically identify the correlation between the trigger and the response.

10. The method of claim 4, further comprising:
pausing or terminating execution of the test scenario when the response of the controller-based network exceeds a failure-tolerance level, the failure-tolerance level being defined by the analysis parameter; and
notifying a user that the response of the controller-based network exceeds the failure-tolerance level.

11. A system comprising:
an automation framework that coordinates with a centralized control plane of a controller-based network to test the controller-based network, the automation framework comprising:
an identification module, stored in memory, that identifies the controller-based network, the controller-based network comprising a controller that enables centralized management of a flow of packets among devices in the controller-based network by providing the centralized control plane for the controller-based network;
an input module, stored in memory, that receives a test scenario comprising at least one trigger that causes a fault in the controller-based network and also receives an automation template that comprises at least one test parameter for utilizing the centralized control plane to execute the test scenario in the controller-based network; and
a test module, stored in memory, that uses the centralized control plane to automatically execute the test scenario on the controller-based network in accordance with the test parameter; and
at least one hardware processor that executes the identification module, the input module, and the test module included in the automation framework.

12. The system of claim 11, further comprising:
a detection module, stored in memory, that detects a response of the controller-based network to the fault by automatically examining the controller-based network before and/or after execution of the test scenario; and
an analysis module, stored in memory, that uses the centralized control plane of the controller-based network to automatically identify, without user control, a correlation between the trigger and the response of the controller-based network; and
wherein the hardware processor further executes the detection module and the analysis module.

13. The system of claim 12, wherein:
the input module identifies, within the automation template, an analysis parameter that defines a failure-tolerance level that allows the test scenario to continue to execute when the controller-based network gracefully recovers from the fault;
the response of the controller-based network comprises gracefully failing over from a network path affected by the fault to a network path that is not affected by the fault; and
the analysis module determines that the response of the controller-based network is below the failure-tolerance level and allows the test scenario to continue to execute.

14. The system of claim 12, wherein the detection module detects the response of the controller-based network by performing at least one of:
detecting traffic anomalies in the controller-based network; and
monitoring stability of one or more systems within the controller-based network.

15. The system of claim 12, wherein the analysis module identifies the correlation between the trigger and the response by:
identifying information in the centralized control plane that is indicative of how data flows within the controller-based network; and
analyzing the information indicative of how data flows within the controller-based network to automatically identify the correlation between the trigger and the response.

16. The system of claim 12, wherein the analysis module identifies the correlation between the trigger and the response by:
identifying an arrangement of devices within the controller-based network; and analyzing the arrangement of the devices within the controller-based network to trace how the trigger caused the response.

17. The system of claim 11, further comprising a user interface that receives at least one of:
- a selection of a plurality of triggers to inject into the controller-based network, the plurality of triggers comprising the trigger that causes the fault, or
- a priority for injecting each trigger in the plurality of triggers during execution of the test scenario.

18. The system of claim 11, wherein the controller executes the automation framework within a virtual machine and/or a daemon running on the controller.

19. The system of claim 11, wherein the automation framework uses the centralized control plane to automatically execute the test scenario by coordinating with at least one of a control layer or a management layer of the centralized control plane.

20. A non-transitory computer-readable-storage medium comprising one or more computer-readable instructions that, when executed by at least one processor of a computing device, cause the computing device to:
- identify a controller-based network, the controller-based network comprising a controller that enables centralized management of a flow of packets among devices in the controller-based network by providing a centralized control plane for the controller-based network;
- receive a test scenario comprising at least one trigger that causes a fault in the controller-based network;
- receive an automation template that comprises at least one test parameter for utilizing the centralized control plane to execute the test scenario in the controller-based network; and
- use the centralized control plane to automatically execute the test scenario on the controller-based network in accordance with the test parameter.

* * * * *